US008851984B2

(12) United States Patent
Lyons

(10) Patent No.: US 8,851,984 B2
(45) Date of Patent: Oct. 7, 2014

(54) SYSTEM AND METHOD TO IMPOSE ACTIVITY LIMITATIONS ON A USER WITH BIOMETRICAL ENFORCEMENT

(75) Inventor: Martin Lyons, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 13/605,801

(22) Filed: Sep. 6, 2012

(65) Prior Publication Data

US 2013/0244781 A1 Sep. 19, 2013

Related U.S. Application Data

(63) Continuation of application No. 12/842,373, filed on Jul. 23, 2010, now Pat. No. 8,282,478.

(51) Int. Cl.
*A63F 13/00* (2014.01)
*G07F 17/32* (2006.01)

(52) U.S. Cl.
CPC ........ *G07F 17/3241* (2013.01); *G07F 17/3237* (2013.01); *G07F 17/3206* (2013.01)
USPC .................................. 463/29; 463/20; 463/36

(58) Field of Classification Search
USPC .................. 463/16, 20, 23, 24, 25, 29, 42, 36
See application file for complete search history.

(56) References Cited

U.S. PATENT DOCUMENTS

| | | | | |
|---|---|---|---|---|
| 6,629,890 | B2 * | 10/2003 | Johnson | 463/25 |
| 7,016,876 | B1 * | 3/2006 | Lanier et al. | 705/45 |
| 8,021,231 | B2 * | 9/2011 | Walker et al. | 463/29 |
| 2002/0111210 | A1 * | 8/2002 | Luciano et al. | 463/29 |
| 2003/0190944 | A1 * | 10/2003 | Manfredi et al. | 463/20 |
| 2006/0211493 | A1 * | 9/2006 | Walker et al. | 463/29 |
| 2010/0062834 | A1 * | 3/2010 | Ryan | 463/25 |

* cited by examiner

*Primary Examiner* — James S McClellan
(74) *Attorney, Agent, or Firm* — Marvin Hein

(57) ABSTRACT

A system and method are disclosed by which, in one embodiment, a user of a user terminal may select or be subject to one or more imposed limitations on their activities over a period of time. The commitment and data corresponding to an identifying biometric feature of the user are stored. When the user uses a user terminal the system and method compares a capture biometrical image of the user with the stored image and if there is a match the one or more limitations is/are enforced. Biometrical data for files where the temporal period of the limitation has passed are ignored to reduce the number of files with which the comparison must be made reducing the number of false matches.

17 Claims, 9 Drawing Sheets

SYSTEM AND METHOD TO IMPOSE ACTIVITY LIMITATIONS ON A USER WITH BIOMETRICAL ENFORCEMENT

CROSS-REFERENCE TO RELATED APPLICATIONS

This application is a continuation application of pending U.S. application Ser. No. 12/842,373 filed Jul. 7, 2010 and titled "A System and Method for a Player to Commit to Limitations with Biometrical Enforcement".

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The field of the invention relates to systems and methods by which limitations on an activity may be enforced through biometric identification. More particularly it relates to a system and method where player may place limitations on their gaming activity and which includes the capturing of biometrical data for enforcement of such limitations.

2. Description of the Related Art

Gaming is a highly regulated business. Some gaming jurisdictions have identified problem gambling as an issue which suggests a commercial response. One response has been to set monetary daily limits for players. For example it has been known for riverboat gaming to limit player's to a bankroll (the amount the player can wager with) of a certain amount each day. Another technique has been for regulators, the gaming venue or the player themselves to exclude the player from play. Such exclusions rely to a great extent on vigilant casino personnel. Such exclusion programs have shortcomings such as that an excluded player can circumvent the exclusion by evading venue security or using a disguise or can simply travel to another venue where the exclusion does not apply.

Where a player voluntarily seeks to exclude or limit their gaming activity, enforcement may be implemented additionally through the venue's player loyalty system. Player loyalty systems are well known such as the Bally CMS® system sold by Bally Technologies, Inc. of Las Vegas, Nev. These loyalty systems include player registry where vital information is given by the player and a player account is established in the system. The player is given a magnetic stripe card encoded with information so the system can tie the card to the player's account. When the player plays a gaming device or table game they present their loyalty card. At a gaming machine the card is presented by the player inserting their card in a card reader. The data is read and the system account is accessed. Players use their loyalty cards to receive "comps" such as money back, meals, lodging or the like provided by the casino.

Where a player "self excludes", i.e. voluntarily places limitations on his/her gaming activity, presentment of the loyalty card alerts personnel to the presence of the excluded player who can then take steps to seek enforcement of the exclusion.

Self-exclusion can be evaded by the player avoiding casino personnel and not presenting their player loyalty card. Further the player can simply travel to another gaming venue where he/she has not self excluded or has not enrolled in a loyalty system.

Regarding player loyalty systems it has been known that such systems can be used across several gaming venues. Boushy, U.S. Pat. No. 7,419,427 issued Sep. 2, 2008 and titled "NATIONAL CUSTOMER RECOGNITION SYSTEM AND METHOD", the disclosure of which is incorporated by reference, discloses an example of such as system.

It has been suggested that passive biometric identification be used in a gaming environment to identify players and "undesirables". Cumbers, U.S. Pat. No. 7,175,528 issued Feb. 13, 2007 titled "PASSIVE BIOMETRIC CUSTOMER IDENTIFICATION AND TRACKING SYSTEM", the disclosure of which is incorporated by reference, discloses an example of such a system. The system disclosed in this reference suggests the use by a player of a personal identification number (PIN) to reduce the number of files against which the biometric sample must be compared as well as culling stale data related to players who do not meet play frequency requirements.

A drawback to prior self-exclusion programs is that, as discussed above, an action is required by the player such as presentment of their loyalty card. A player wishing to evade the exclusion can simply not use a card or use a companion's card. Additionally the player who is self excluded at one venue can go to another nearby venue.

A drawback to using passive biometric identification is that as the number of records grows the probability of returning a false positive, i.e. an incorrect match, increases. As one might imagine a large casino in Las Vegas with hundreds of thousands of visitors per year will quickly be servicing a record of perhaps a million or more files. Where there are affiliated properties such as the casino properties owned and operated by MGM Resorts International in Las Vegas alone, the number of files would quickly exceed several millions of files.

Regarding biometric identification as the biometric data file inventory grows so does the false acceptance rate (FAR). In a work titled INTRODUCTION TO MEDICAL INFORMATION SYSTEM SECURITY, Simon Foley (department of Computer Science University of College Cork) Nov. 21, 2008 (http://www.cs.ucc.ie/~kieran/cs3090/pdf/lecture14_security.pdf) it was postulated that where the FAR is 0.000001 a 50% chance of a false match would occur regarding fingerprint records when the number of files reaches 1000.

There is a need for a system and method where a user can commit to behavioral limitations (or such limitations can be imposed by others) such as in gaming and where the limitations can be enforced using biometric identification. In gaming, the limitations may be in regards to losses, wins, amount wagered, time or the like. There is a need for a player to able to self exclude without the use of a loyalty card. There is a need for a system and method for a player to place limitations (including exclusion) which can be enforced through the passive gathering of biometric data and which reduces the chances of obtaining false matches. There is a need for a system and method which can use biometric data enforcement across multiple venues such as venues in close geographic proximity.

SUMMARY OF THE INVENTION

Accordingly there is set forth according to the present invention a system and method by which a person may self-impose limitations on their activities for a selected duration and where passively captured biometrical data is used to enforce those limitations. In the gaming environment the present invention is directed to a system and method where a player may self-impose limitations on their gaming activity for a selected temporal period and where passively captured biometrical data of the player is used to enforce said limitations.

Toward this end a system and method is set forth for enforcing a commitment to restrict activity by a user. The commitment may be self-imposed by the user or may be imposed by others such as a responsible family member, a governmental agency or by a business. The commitment may relate to gaming activities, shopping activities, consumption activities (such as alcohol consumption) or other activities. The system and method includes a device for capturing data corresponding to a biometric feature of the user at a location associated with said activity. The device may be one or more of a digital camera for capturing an aspect of the user's face, retina scanner, iris scanner, finger print reader, and biological activity sensor such as a device to sense the heartbeat rhythm patterns or a user's infrared heat signature or any other device for passively capturing biometric identification information from the user. The location associated with the activity may be a computer terminal, gaming machine, cash register or bar, for example. A processor and a data structure are provided as well as an apparatus for the user (or other) to input their commitment into the data structure as well as a selected temporal, duration period such as, for example, 24 hours. As but an example the user may input a commitment to limit his gaming losses to $100 in a 24-hour period. This commitment is associated with the user's captured biometric data. When the user attempts to engage in the activity subject to the restriction commitment, their biometric data is passively captured by the data capturing device. The processor is configured to (a) disregard at least said biometric data from said data structure when said corresponding duration period has lapsed and (b) if said biometric data matches stored biometric data in said data structure enforce said commitment. By disregarding data where the commitment temporal period duration has expired, the number of comparison files in the data structure is reduced thereby reducing the chances of obtaining a false or failing to detect a match. The commitment may be enforced by notifying the user of their commitment, third parties (e.g. store or casino personnel) to assist the user in enforcing the commitment or by disabling a device associated with the activity.

There is also set forth a system and method for enforcing gaming limitation criteria related to play of gaming devices which includes a device for generating data corresponding to a biometric feature of players of the gaming device. This device may be one or more of a digital camera, fingerprint scanner, retina or iris scanner or other device suitable for passively capturing biometric information which can be used to identify the player. A processor is provided in communication with said data generating device and with an apparatus for a player (or other) to enter data corresponding to limitation criteria related to the player's play of a gaming device, the limitation having a defined temporal retention period. For example the player may input data corresponding to a limitation criteria that he/she wishes to limit the amount of money wagered to $500 over a 48 hour period. A data structure in communication with the processor stores the limitation criteria and retention period data in association with a corresponding player biometric identification data. When the player seeks to engage in gaming activity at a gaming device the data generating device captures the player's biometrical information and the processor is configured to (a) disregard at least said biometric data from said data structure when said corresponding retention periods have expired and (b) if said biometric information matches stored biometric data in said data structure enforce said limitation criteria upon the player. The processor may disregard the biometrical data by expunging the biometric information data from the data structure when the retention period has expired. Enforcement of the commitment where indicated may include issuing a message to the player and/or disabling the gaming device.

There is also set forth a system and method for enforcing gaming limitation criteria for multiple venues each including one or more gaming devices. In this fashion a player may impose the limitation across several gaming venues such as commonly owned/managed casinos or casinos within a geographic area. The system and method includes a device for generating data corresponding to a biometric feature of players of the gaming devices. As stated above the device may be one or more of a digital camera, for capturing an aspect of the user's face, retina or iris scanner, fingerprint reader, biological activity sensor such as a device to sense the heartbeat rhythm patterns or a player's infrared heat signature or any other device for passively capturing biometric identification data from the player. A processor is in communication with apparatus associated with said gaming devices for a player (or other) to enter data corresponding to limitation criteria, the limitation criteria having a defined temporal retention period. A data structure stores the limitation criteria data in association with a corresponding player biometrical data. When a player desires to play a gaming device the biometric data capturing device passively captures the biometric information of the player which is communicated to the processor. The processor is configured to (a) disregard at least the biometrical data in the data structure when the corresponding retention periods have expired and (b) if said generated biometrical data matches stored biometrical data in said data structure enforce said limitation criteria upon the player. By disregarding data where the commitment duration has expired, the number of comparison files in the data structure is reduced thereby reducing the chances of obtaining a false or failing to detect a match. Where the limitation period has expired preferably at least the associated biometric data is expunged from the data structure.

Where the gaming venue employs a player loyalty program the self-limitation program may be incorporated into the system such as, for example, enabling the player to re-invoke limitation criteria used for example on prior visits.

The limitation criteria in a gaming context may be entered, for example, at a data input device at the gaming machine such as a touch screen device. The processor may be configured to, upon request by the player, display the player's prior limitation criteria, the status of their active limitation criteria or suggested limitation templates for the player to select. Enforcement includes disabling of the gaming machine.

Other features and numerous advantages of the various embodiments will become apparent from the following detailed description when viewed in conjunction with the corresponding drawings.

DETAILED DESCRIPTION OF THE PREFERRED EMBODIMENTS

Figure 1:
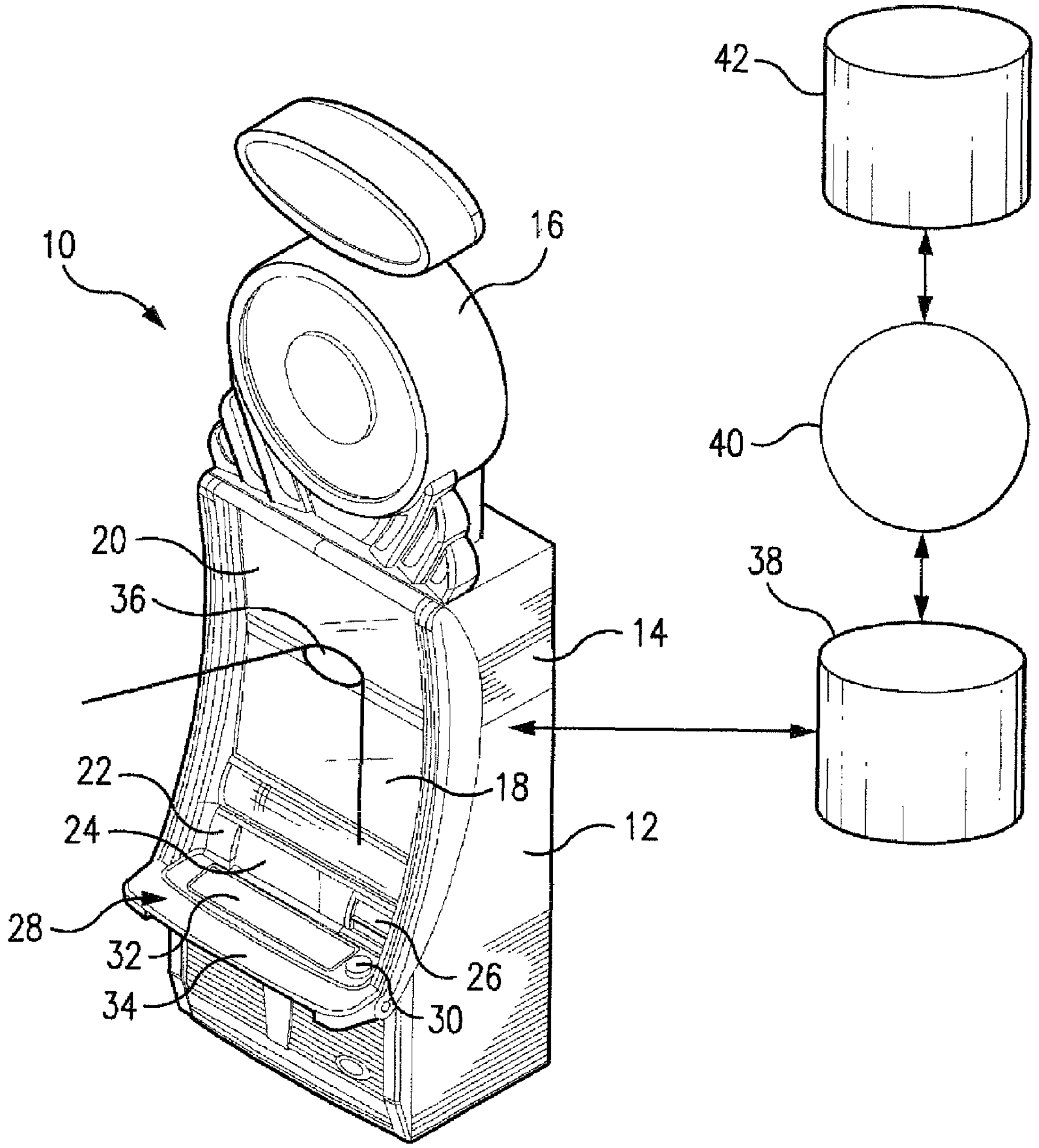
FIG. 1 illustrates a gaming device and system interface.

Referring now to the drawings, wherein like reference numbers denote like or corresponding elements throughout the drawings, and more particularly referring to FIG. 1, there is shown an example of a gaming device 10. While the following description is directed to a gaming environment it is to be understood that the present invention is not limited to gaming applications. The present invention is applicable to other areas where a user (or third party) wishes to impose temporal restrictions or limitations on the activities of the user. For example the present invention can be applied to activities such as shopping, usage of a device or apparatus such as restricting usage of a computer or machinery for a period of time, consumption of alcoholic beverages or the like. Further while the present invention is directed to the imposition of limitations or commitments in regards to gaming devices 10 it should be understood that the present invention can be applied to other gaming activities such as table gaming (roulette, Blackjack, Craps, etc.), sports betting or the like.

The gaming device 10 includes a cabinet 12 housing various components. The cabinet 12 includes a top box 14 as well. A topper 16 includes lights and backlit printed panels to attract players to the device 10. The cabinet 12 supports a main game display 18 which may be a CRT, LCD, OLED or other electronic video display.

Alternatively the main game display 18 may be a window for viewing electro-mechanical stepper reels as is known in the art. The cabinet 12 and more particularly the top box 14 support a secondary display 20. The secondary display 20 may be a backlit printed glass or plastic panel or may be a display of the type described in reference to the main game display 18. The main game display 18 is positioned to display primary content to the player such as a game. The secondary display 20 typically displays additional content such as information about the game, e.g. game name and associated graphics and pay table but may also display other content such as a bonus game or, in combination with the main game display 18, a common game or bonus game display. It should be understood that the displays could display other content such as advertising, sports or other programming or the like.

The gaming device 10 also includes a gaming system interface 22 which has a display 24 and a slot 26 for receiving and reading a player tracking card. As described above the gaming device 10 is in communication with one or more systems such a player loyalty system and slot management/accounting system. Currently the system(s) provider also provides the gaming system interface 22 so that the system(s) machine can communicate.

A button panel 28 is provided to enable the player to interact with the gaming device 10. The button panel 28 includes one or more displaceable buttons 30. As shown in FIG. 1 the button panel 28 may also include an input device such as a touch screen 32 to display touch or gesture activated buttons (not shown) in addition to any displaceable buttons 30. By a "displaceable" button 30 what is meant is a mechanical button which can be physically displaced by sliding, rotating, rocking, depressing or the like to enter an interface input. As part of the button panel 28 or as a separate component a cushioned hand rest 34 may also be provided.

Disposed at the gaming device 10 is a device for passively capturing biometric information data from a player. In the preferred embodiment this device is a digital camera 36 located and focused to obtain a digital image of the face of a player. Alternatively the device may be a fingerprint reader located, for example, in button 30 or touch screen 32. Other examples of such devices include retina or iris scanners, infrared detectors, voice detectors, biological system sensors such as heart rhythm pattern detectors or other devices configured to passively obtain a biometric sample of the player sufficient to identify the player and digitize the same. For purposes of the description of the preferred embodiment the invention will be described where the device is the digital camera 36 for capturing a facial feature image of a player for purposes of identification.

The data corresponding to the digital image captured by the camera 36 is provided to a local data server 38 which includes a data memory structure configured to store data corresponding to biometrical information data as well as limitation data. For example, as described below, when a player establishes a commitment to limit their gaming activities, the player's biometrical data and limitation data are stored at the data structure preferably in the form of a data file. The gaming device 10 is located at a venue such as a casino, club or store. What is meant by a local server 38 is a situation where the server is geographically associated with the venue hosting the gaming device 10. Where the system and method of the present invention is configured to apply to multiple venues, the local server 38 is in communicates through a network 40 such as the Internet or a dedicated LAN or WAN with a host server 42 which may be located at a remote location. Other venues would likewise have their local servers in communication with the host server 40 in a similar manner. The data stored at the local servers 38 is shared with the host server 42 whose data structure stores biometrical and commitment data from all venues.

Figure 5A:
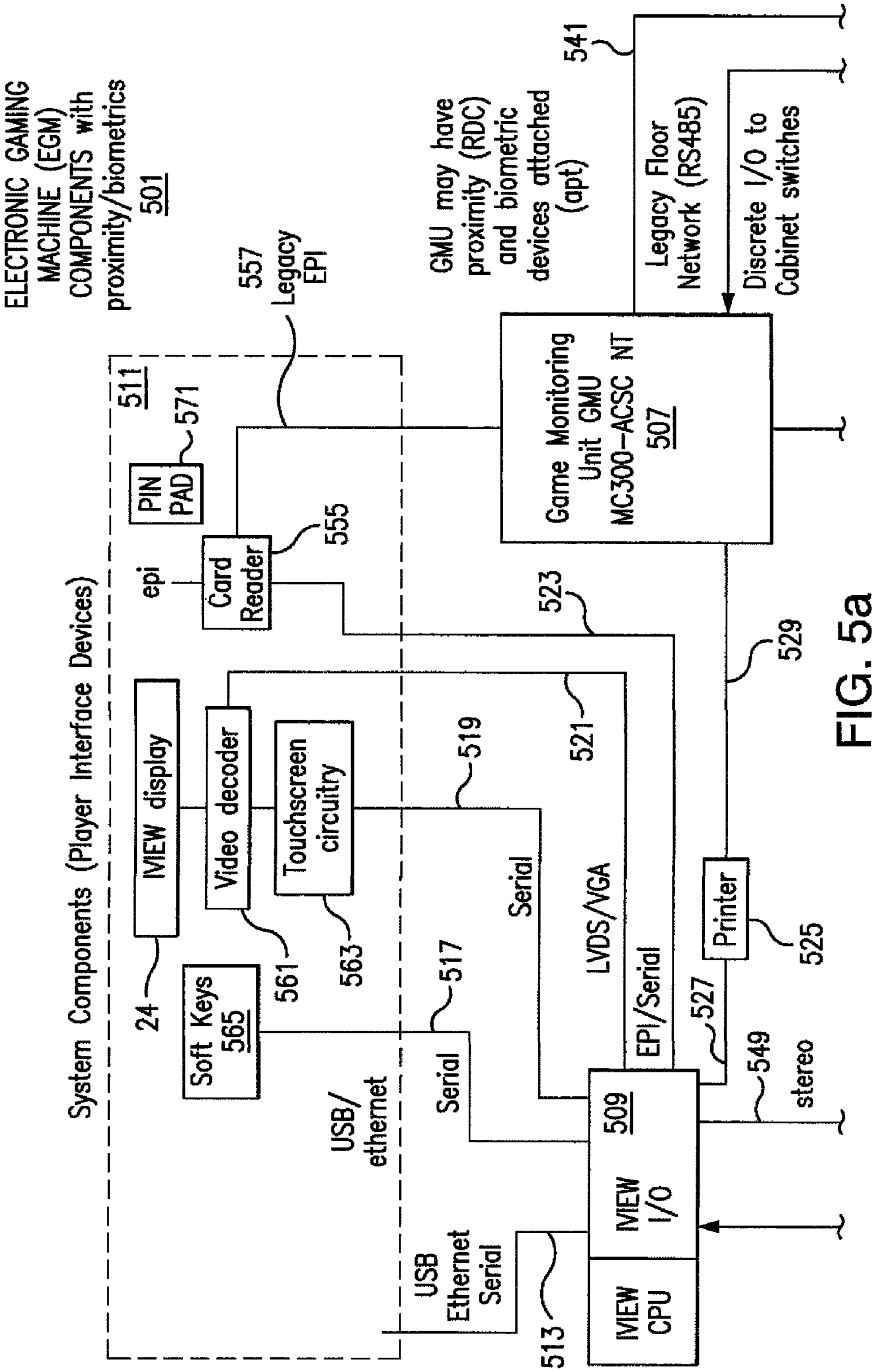
FIGS. 5*a*-*b* is a diagram of a gaming device controller and system interface.
Figure 5B:
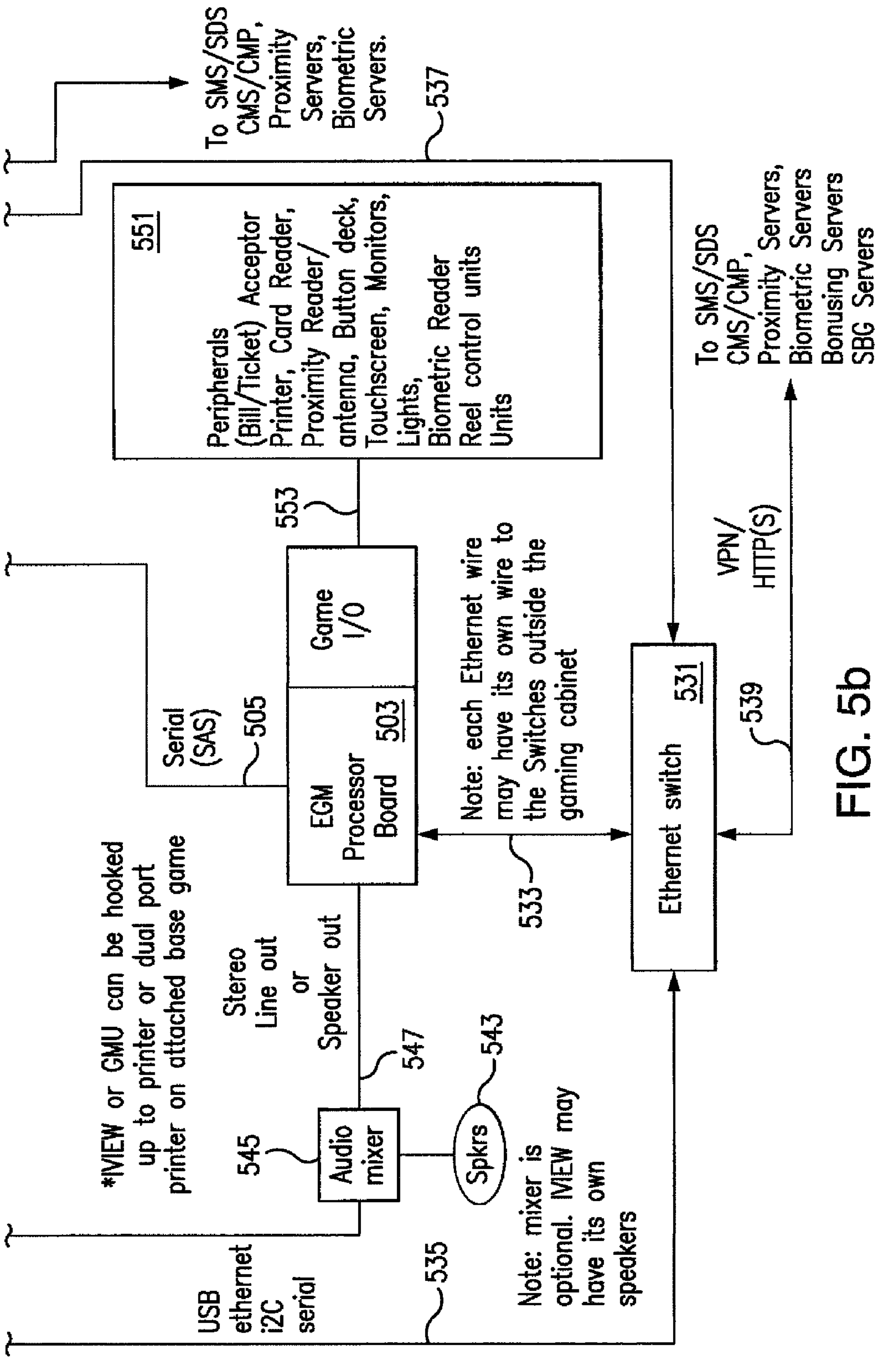

Turning to FIGS. 5*a* and *b* the gaming device 10 hardware 501 for their controller(s) is shown in accordance with one or more embodiments. The hardware 501 includes base game integrated circuit board 503 (EGM Processor Board) connected through serial bus 505 to game monitoring unit (GMU) 507 (such as a Bally MC300 or ACSC NT), and player interface integrated circuit board (PIB) 509 connected to player system interface 22 devices 511 over buses 513, 517, 519, 521, 523. Gaming voucher ticket printer 525 (for printing player cash out tickets) is connected to PIB 509 and GMU 507 over buses 527, 529. EGM Processor Board 503, PIB 509, and GMU 507 connect to Ethernet switch 531 over buses 533, 535, 537. Ethernet switch 531 connects to a slot management system (SMS) and a casino management system (CMS) network over bus 539. Ethernet switch 531 may also connect to a server based gaming server or a downloadable gaming server. GMU 507 also may connect to the SMS and CMS network over bus 541. Speakers 543 produce sounds related to the game or according to the present invention connect through audio mixer 545 and buses 547, 549 to EGM Processor Board 503 and PIB 509.

Peripherals 551 connect through bus 553 to EGM Processor Board 503. The peripherals 551 include, but are not limited to the following and may include individual processing capability: bill/ticket acceptor to validate and accept currency and ticket vouchers, player loyalty card reader, the player interfaces including features to support the touch screen/gesture functionality, main game display 18, secondary display 20 (with or without touch screen functionality), monitors and lights, reel control units where the gaming device 10 is a stepper game and biometric reading (capturing) devices such as the digital camera 36. For example, a bill/ticket acceptor is typically connected to the game input-output board of the EGM processing board 503 (which is, in turn, connected to a conventional central processing unit ("CPU") board), such as an Intel Pentium microprocessor mounted on a gaming motherboard. The I/O board may be connected to CPU processor board by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. EGM processor board 503 executes a game program that causes the gaming device 10 to display and play a game. The various components and included devices may be installed with conventionally and/or commercially available components, devices, and circuitry into a conventional and/or commercially available gaming device cabinet 12, examples of which are described above.

When a player has inserted a form of currency such as, for example and without limitation, paper currency, coins or tokens, cashless tickets or vouchers, electronic funds transfers or the like into the currency acceptor, a signal is sent by way of bus 553 to the I/O board and to EGM processor board 503 which, in turn, assigns an appropriate number of credits for play in accordance with the game program. The player may further control the operation of the gaming device 10 by way of other peripherals 551, for example, to select the amount to wager via a player interface such as the button panel 28. The game starts in response to the player operating a start mechanism such as a handle, button such as a SPIN/RESET button touch screen icon or depressing button 30. The game program includes a random number generator to provide a display of randomly selected indicia on one or more of the main and/or secondary displays 18, 20. In some embodiments, the random number generator may be physically separate from gaming device 10; for example, it may be part of a central determination host system which provides random game outcomes to the game program. Finally, processor board 503 under control of the game program and OS compares the final display of indicia to a pay table. The set of possible game outcomes may include a subset of outcomes related to the triggering of a feature or bonus game. In the event the displayed outcome is a member of this subset, processor board 503, under control of the game program and by way of I/O Board 553, may cause feature game play to be presented on the main/secondary display(s) 18, 20.

Predetermined payout amounts for certain outcomes, including feature game outcomes, are stored as part of the game program. Such payout amounts are, in response to instructions from processor board 503, provided to the player in the form of coins, credits or currency via I/O board and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server such as a downloadable gaming server.

The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 507 includes an integrated circuit board and GMU processor and memory including coding for network communications, such as the G2S (game-to-system) protocol from the Gaming Standards Association, Las Vegas, Nev., used for system communications over the network. As shown, GMU 507 may connect to a player card reader 555 through bus 557 and may thereby obtain player card information and transmit the information over the network through bus 541. Gaming activity information may be transferred by the EGM Processor Board 503 to GMU 507 where the information may be translated into a network protocol, such as S2S, for transmission to a server, such as a player tracking server, where information about a player's playing activity may be stored in a designated server database.

PID 509 includes an integrated circuit board, PID processor, and memory which includes an operating system, such as Windows CE, a player interface program which may be executable by the PID processor together with various input/output (I/O) drivers for respective devices which connect to PID 509, such as player interface devices 511, and which may further include various games or game components playable on PID 509 or playable on a connected network server and PID 509 is operable as the player interface. PID 509 connects to card reader 555 through bus 523, player system interface display 24 through video decoder 561 and bus 521, such as an LVDS or VGA bus.

As part of its programming, the PID processor executes coding to drive system interface display 24 and provide messages and information to a player. Touch screen circuitry 563 interactively connects display 24 and video decoder 561 to PID 509; such that a player may input information and cause the information to be transmitted to PID 509 either on the player's initiative or responsive to a query by PID 509. Additionally soft keys 565 connect through bus 517 to PID 509 and operate together with the display 24 to provide information or queries to a player and receive responses or queries from the player. PID 509, in turn, communicates over the CMS/SMS network through Ethernet switch 531 and busses 535, 539 and with respective servers, such as a player tracking server described above.

Player interface devices 511 are linked into the virtual private network of the system components in gaming machine 501. The system components include the iVIEW® device ('iView" is a registered trademark of Bally Gaming, Inc.) processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

In an alternative embodiment the player system interface including the display 24 may instead be presented, upon command or request by the player, as a portion of the main display 18. Where the main display 18 has touch screen functionality, upon command or request the content at the main game display 18 such as a video reel game display, is sized to accommodate a player interface display panel at the main game display 18 in a manner as suggested in FIG. 4. The touch screen functionality for the main game display 18 is configured to enable the player to interface with the interface through touch screen controls (buttons, sliders, arrows, etc.).

Figure 6:
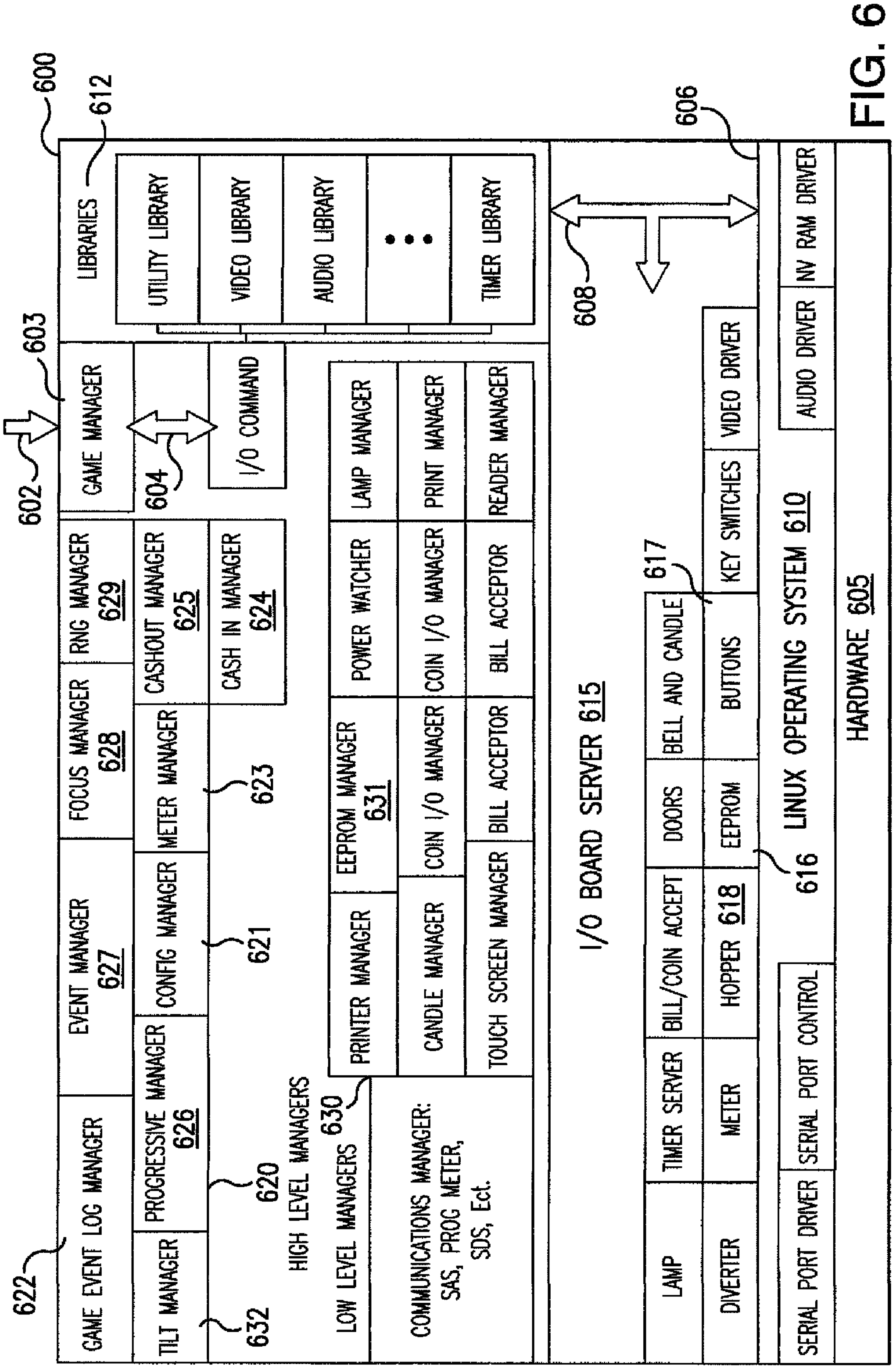
FIG. 6 is a block diagram of the logical components of a gaming kernel in accordance with one or more embodiments.

Turning to FIG. 6 is a functional block diagram of a gaming kernel 600 of a game program under control of processor board 503, uses gaming kernel 600 by calling into application programming interface (API) 602, which is part of game manager 603. The components of game kernel 600 as shown in FIG. 6 are only illustrative, and should not be considered limiting. For example, the number of managers may be changed, additional managers may be added or some managers may be removed without deviating from the scope and spirit of the invention.

As shown in the example, there are three layers: a hardware layer 605; an operating system layer 610, such as, but not limited to, Linux; and a game kernel layer 600 having game manager 603 therein. In one or more embodiments, the use of a standard operating system 610, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 600 executes at the user level of the operating system 610, and itself contains a major component called the I/O Board Server 615. To properly set the bounds of game application software (making integrity checking easier), all game applications interact with gaming kernel 600 using a single API 602 in game manager 603. This enables game applications to make use of a well-defined, consistent interface, as well as making access points to gaming kernel 600 controlled, where overall access is controlled using separate processes.

For example, game manager 603 parses an incoming command stream and, when a command dealing with I/O comes in (arrow 604), the command is sent to an applicable library routine 612. Library routine 612 decides what it needs from a device, and sends commands to I/O Board Server 615 (see arrow 608). A few specific drivers remain in operating system 610's kernel, shown as those below line 606. These are built-in, primitive, or privileged drivers that are (i) general (ii) kept to a minimum and (iii) are easier to leave than extract. In such cases, the low-level communications is handled within operating system 610 and the contents passed to library routines 612.

Thus, in a few cases library routines may interact with drivers inside operating system 610, which is why arrow 608 is shown as having three directions (between library utilities 612 and I/O Board Server 615, or between library utilities 612 and certain drivers in operating system 610). No matter which path is taken, the logic needed to work with each device is coded into modules in the user layer of the diagram. Operating system 610 is kept as simple, stripped down, and common across as many hardware platforms as possible. The library utilities and user-level drivers change as dictated by the game cabinet or game machine in which it will run. Thus, each game cabinet or game machine may have an industry standard processor board 503 connected to a unique, relatively dumb, and as inexpensive as possible I/O adapter board, plus a gaming kernel 600 which will have the game-machine-unique library routines and I/O Board Server 615 components needed to enable game applications to interact with the gaming machine cabinet. Note that these differences are invisible to the game application software with the exception of certain functional differences (i.e., if a gaming cabinet has stereo sound, the game application will be able make use of API 602 to use the capability over that of a cabinet having traditional monaural sound).

Game manager 603 provides an interface into game kernel 600, providing consistent, predictable, and backwards compatible calling methods, syntax, and capabilities by way of game application API 602. This enables the game developer to be free of dealing directly with the hardware, including the freedom to not have to deal with low-level drivers as well as the freedom to not have to program lower level managers 630, although lower level managers 630 may be accessible through game manager 603's interface 602 if a programmer has the need. In addition to the freedom derived from not having to deal with the hardware level drivers and the freedom of having consistent, callable, object-oriented interfaces to software managers of those components (drivers), game manager 603 provides access to a set of high level managers 620 also having the advantages of consistent callable, object-oriented interfaces, and further providing the types and kinds of base functionality required in casino-type games. Game manager 603, providing all the advantages of its consistent and richly functional interface 602 as supported by the rest of game kernel 600, thus provides a game developer with a multitude of advantages.

Game manager 603 may have several objects within itself, including an initialization object (not shown). The initialization object performs the initialization of the entire game machine, including other objects, after game manager 603 has started its internal objects and servers in appropriate order. In order to carry out this function, the kernel's configuration manager 621 is among the first objects to be started; configuration manager 621 has data needed to initialize and correctly configure other objects or servers.

The high level managers 620 of game kernel 600 may include game event log manager 622 which provides, at the least, a logging or logger base class, enabling other logging objects to be derived from this base object. The logger object is a generic logger; that is, it is not aware of the contents of logged messages and events. The log manager's 622 job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 623 manages the various meters embodied in the game kernel 600. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 623 receives its initialization data for the meters, during start-up, from configuration manager 621. While running, the cash in 624 and cash out 625 managers call the meter manager's 623 update functions to update the meters. Meter manager 623 will, on occasion, create backup copies of the soft meters by storing the soft meters' readings in EEPROM. This is accomplished by calling and using EEPROM manager 631.

Progressive manager 626 manages progressive games playable from the game machine. Event manager 627 is generic, like log manager 622, and is used to manage various gaming device events. Focus manager 628 correlates which process has control of various focus items. Tilt manager 632 is an object that receives a list of errors (if any) from configuration manager 621 at initialization, and during game play from processes, managers, drivers, etc. that may generate errors. Random number generator manager 629 is provided to allow easy programming access to a random number generator (RNG), as a RNG is required in virtually all casino-style (gambling) games. RNG manager 629 includes the capability of using multiple seeds.

A credit manager object (not shown) manages the current state of credits (cash value or cash equivalent) in the game machine, including any available winnings, and further provides denomination conversion services. Cash out manager 625 has the responsibility of configuring and managing monetary output devices. During initialization, cash out manager 625, using data from configuration manager 621, sets the cash out devices correctly and selects any selectable cash out denominations.

During play, a game application may post a cash out event through the event manager 627 (the same way all events are handled), and using a call back posted by cash out manager 625, cash out manager 625 is informed of the event. Cash out manager 625 updates the credit object, updates its state in non-volatile memory, and sends an appropriate control message to the device manager that corresponds to the dispensing device. As the device dispenses dispensable media, there will typically be event messages being sent back and forth between the device and cash out manager 625 until the dispensing finishes, after which cash out manager 625, having updated the credit manager and any other game state (such as some associated with meter manager 623) that needs to be updated for this set of actions, sends a cash out completion event to event manager 627 and to the game application thereby. Cash in manager 624 functions similarly to cash out manager 625, only controlling, interfacing with, and taking care of actions associated with cashing in events, cash in devices, and associated meters and crediting.

In a further example, in accordance with one or more embodiments, I/O server 615 may write data to the gaming machine EEPROM memory, which is located in the gaming machine cabinet and holds meter storage that must be kept even in the event of power failure. Game manager 603 calls the I/O library functions to write data to the EEPROM. The I/O server 615 receives the request and starts a low priority EEPROM thread 616 within I/O server 615 to write the data. This thread uses a sequence of 8 bit command and data writes to the EEPROM device to write the appropriate data in the proper location within the device. Any errors detected will be sent as IPC messages to game manager 603. All of this processing is asynchronous.

In accordance with one embodiment, button module 617 within I/O server 615, polls (or is sent) the state of buttons every two milliseconds. These inputs are debounced by keeping a history of input samples. Certain sequences of samples are required to detect a button was pressed, in which case the I/O server 615 sends an inter-process communication event to game manager 603 that a button was pressed or released. In some embodiments, the gaming machine may have intelligent distributed I/O which debounces the buttons, in which case button module 617 may be able to communicate with the remote intelligent button processor to get the button events and simply relay them to game manager 603 via IPC messages. In still another embodiment, the I/O library may be used for pay out requests from the game application. For example, hopper module 618 (where a coin/token hopper is provided) must start the hopper motor, constantly monitor the coin sensing lines of the hopper, debounce them, and send an IPC message to the game manager 603 when each coin is paid.

Further details, including disclosure of lower level fault handling and/or processing, are included in U.S. Pat. No. 7,351,151 entitled "Gaming Board Set and Gaming Kernal for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 7A:
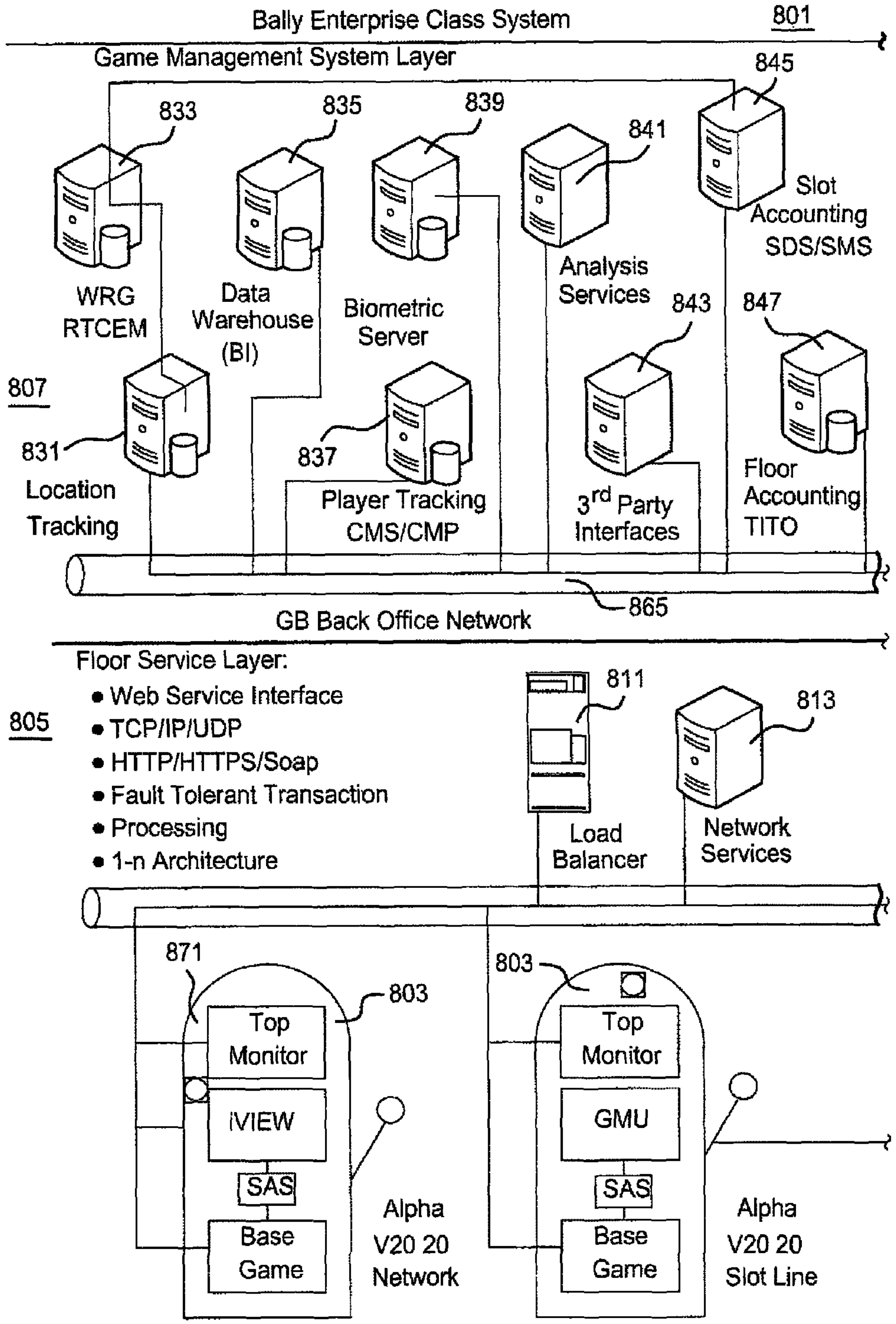
FIGS. 7*a* and *b* represent a schematic block diagram showing the hardware elements of a networked gaming system in accordance with one or more embodiments.
Figure 7B:
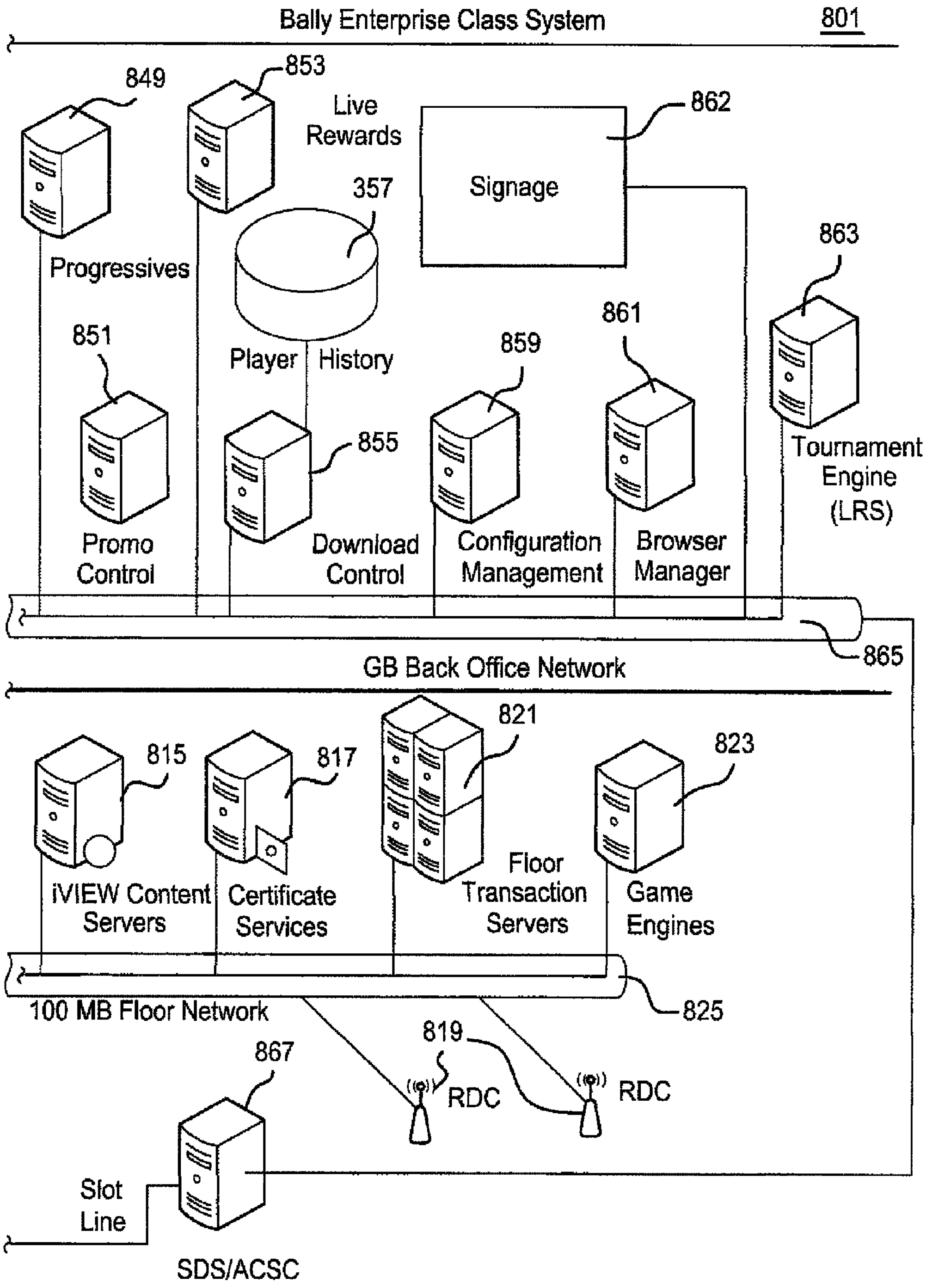

Referring to FIGS. 7*a* and *b*, an enterprise gaming system 801 is shown in accordance with one or more embodiments. Enterprise gaming system 801 may include one casino or multiple locations and generally includes a network of gaming devices, floor management system (SMS) 805, and casino management system (CMS) 807. SMS 805 may include load balancer 811, network services servers 813, player system interface (iVIEW®) content servers 815, certificate services server 817, floor radio dispatch receiver/transmitters (RDC) 819, floor transaction servers 821 and game engines 823, each of which may connect over network bus 825 to gaming machines 803. CMS 807 may include location tracking server 831, WRG RTCEM server 833, data warehouse server 835, player tracking server 837, biometric server 839, analysis services server 841, third party interface server 843, slot accounting server 845, floor accounting server 847, progressives server 849, promo control server 851, bonus game (such as Bally Live Rewards) server 853, download control server 855, player history database 857, configuration management server 859, browser manager 861, tournament engine server 863 connecting through bus 865 to server host 867 and gaming machines 803. The various servers and gaming machines 803 may connect to the network with various conventional network connections (such as, for example, USB, serial, parallel, RS485, Ethernet). Additional servers which may be incorporated with CMS 807 include a responsible gaming limit server (not shown), advertisement server (not shown), and a control station server (not shown) where an operator or authorized personnel may select options and input new programming to adjust each of the respective servers and gaming machines 803. SMS 805 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

The gaming devices include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 807 and/or SMS 805 servers and devices, firmware, media, operating systems, and configurations may be downloaded to the system components of respective gaming devices for upgrading or managing floor content and offerings in accordance with operator selections or automatically depending upon CMS 807 and SMS 805 master programming. The data and programming updates to gaming devices 803 are authenticated using conventional techniques prior to install on the system components.

In various embodiments, any of the gaming devices may be a mechanical reel spinning slot machine, video slot machine, video poker machine, video bingo machine, keno machine, or a gaming device offering one or more of the above described games including an interactive wheel feature. Alternately, gaming devices 803 may provide a game with an accumulation-style feature game as one of a set of multiple primary games selected for play by a random number generator, as described above. A gaming system of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in U.S. application Ser. No. 11/938,079, entitled "Networked System and Method for Group Gaming," filed on Nov. 9, 2007, which is hereby incorporated by reference in its entirety for all purposes.

Figure 2:
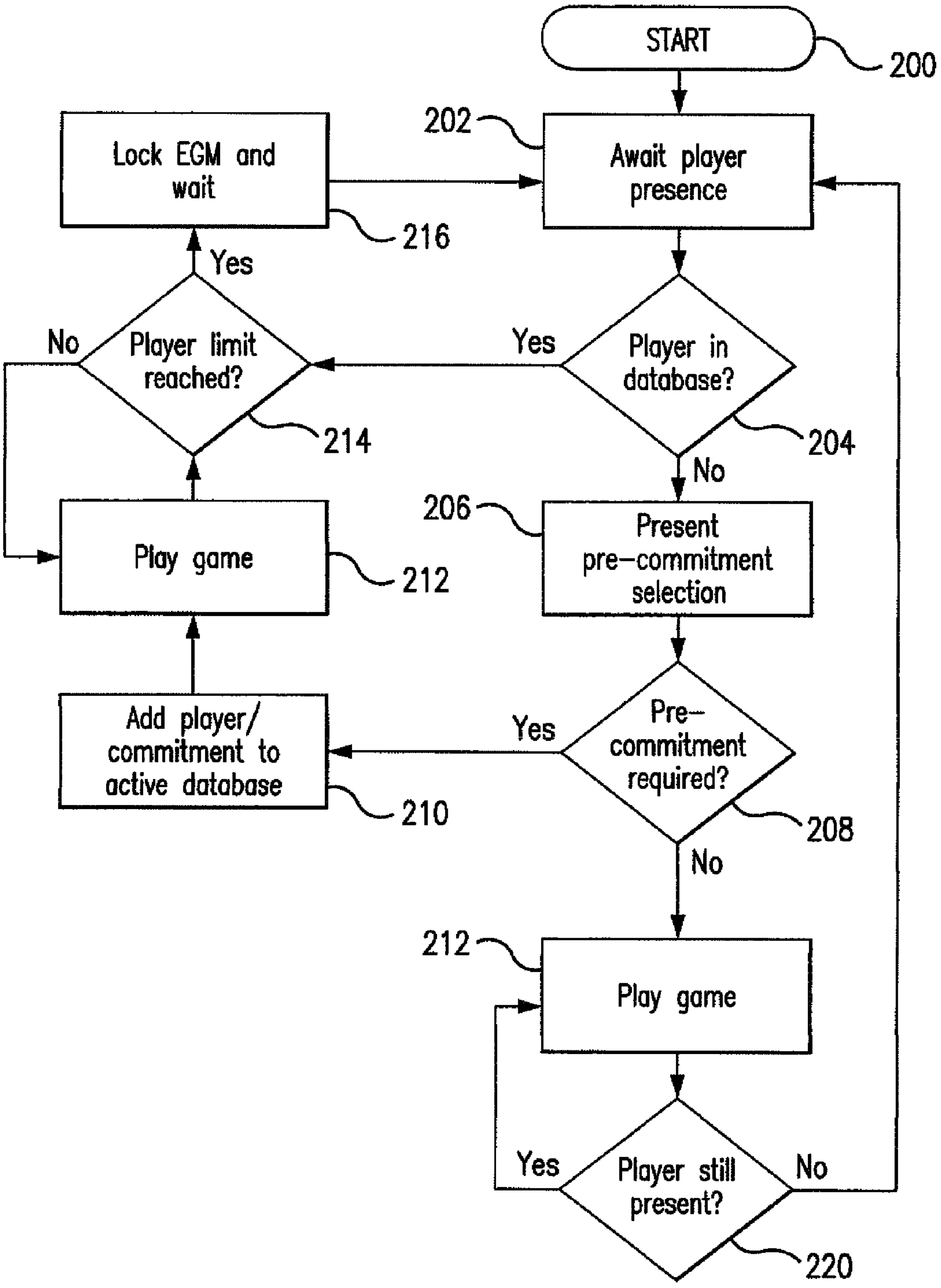
FIG. 2 illustrates a logic diagram for a player to commit to limitation criteria in gaming according to an embodiment of the present invention.
Figure 3:
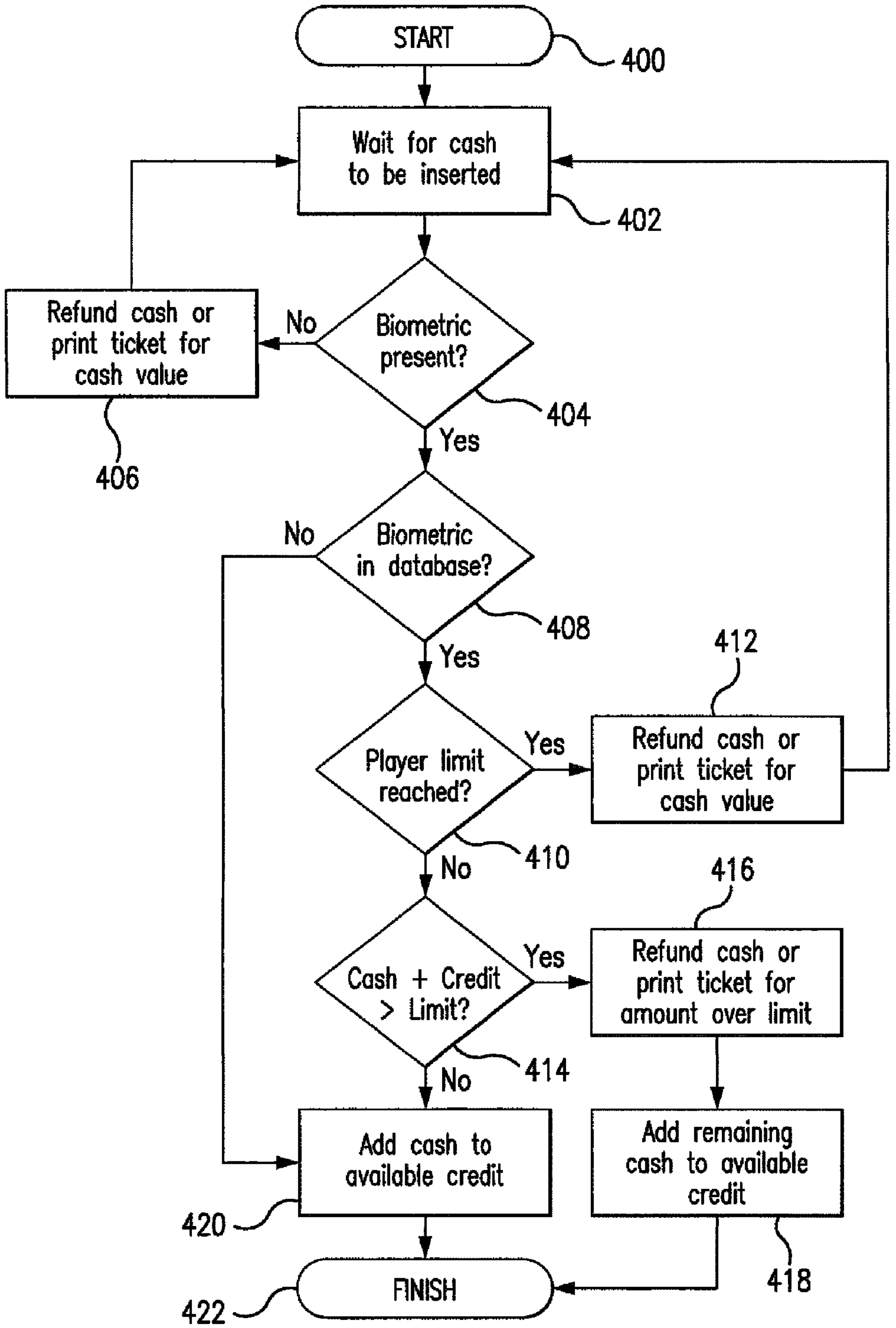
FIG. 3 illustrates a logic diagram related to enforcement of the commitment according to an embodiment of the present invention.

Turning to FIGS. 1-4 the operation of the system of the present invention will now be described. FIG. 2 illustrates the operation where a player initially establishes a commitment to a limitation to their gaming activities. With particular reference to FIG. 2 at 200 the gaming device 10 and system are both placed in an active state. At 202 the gaming device 10 is in an idle mode awaiting a player. When a player sits down in front of the gaming device 10 the camera 36 passively captures the player's facial image. The camera 36 may be prompted by a motion sensor (not shown) or by the player inserting money or a voucher to establish credits on the gaming device 10. Alternatively the camera 36 may be programmed or controlled to capture images are regular intervals. Other triggers for the capture of the player's facial image can be used.

The image captured by the cameral 36 is digitized and transmitted though a communication network such as bus 865 (FIG. 7*a*) to the local server 38 such as biometric server 839 (FIG. 7*a*). At the local server 38 a processor compares the image to the images stored in the server's data structure and at 204 determines if there is a match, i.e. if the player can be identified. If the player cannot be identified at 206 the local server 38 issues a signal to the gaming device 10 (or alternative the signal is sent to the network services server 813 which issues the signal to cause an interface at the gaming device 10 to present an offer for the player to voluntarily select to commit to a gaming limitation. The interface with the player may be through the system interface 22 such as a Bally iView® device and its display 24. The limitations a player may register for include one or more of (i) play time, (ii) maximum losses, (iii) number of consecutive days of gaming, (iv) net win amount, (v) net loss amount (vi) number of plays or the like.

Figure 4:
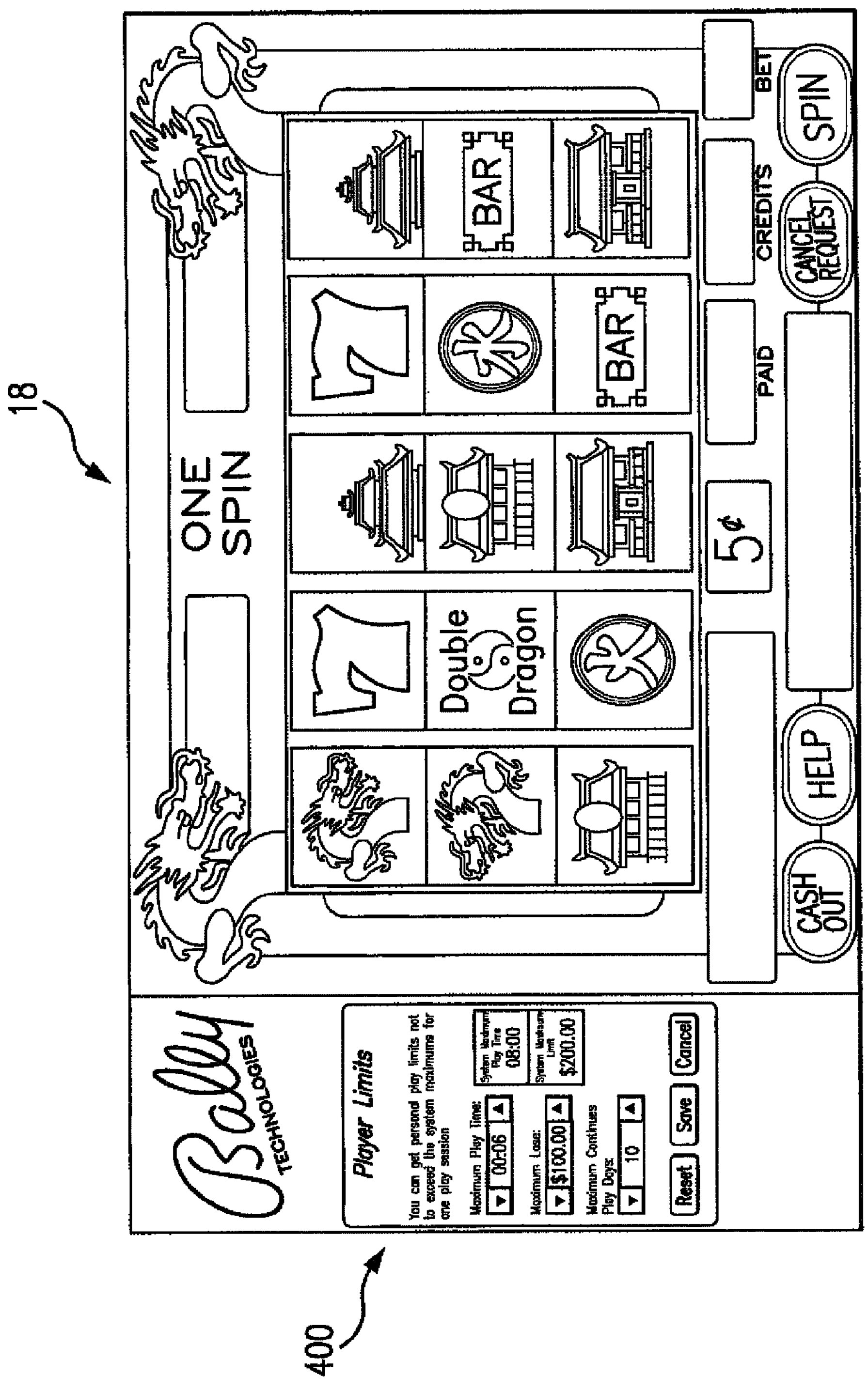
FIG. 4 is an example of a display at a gaming device through which the player may enter data corresponding to their commitment or limitation criteria.

With reference to FIG. 4 the presentment of the offer to commit to a limitation, instead of presentations at the system interface 22 the system may control the EGM to display a panel or "a window" 400 defined at the main game display 18. In the example shown in FIG. 4 the player interface 400 presents an example of a dashboard from which the player can select a configuration for their self-limitation by selecting from categories of MAXIMUM PLAY TIME, MAXIMUM LOSS, MAXIMUM NUMBER OF DAYS PLAYED. Touch screen buttons are defined at the main game display 18 as well as RESET, SAVE and CANCEL touch screen buttons. The player makes their selection such as, for example, selecting to voluntarily limit their play time to 4 hours. This selection is saved at one or more server memory data structures and is associated with the captured biometric information data from the digital camera 36. This association may be by a tag or by creating a file. Where the player has enrolled in the venue's casino player tracking program and is using their loyalty card the data can be saved associated with the player's account. The player's account may store the player's prior commitment templates for future presentation to the player. For example, when a player returns to the venue the system may recall the player's last expired commitment for display to the player so that the player may opt to impose the same limitation(s).

Returning to FIG. 2, in addition to any self-imposed limitations the venue or jurisdiction may have required pre-commitment limitations that apply regardless of a player's voluntary commitment such as, for example, a player cannot lose more than $200/day. If the venue requires such a restriction at 208 this restriction is applied to limitation criteria for the player and saved at a data structure associated with the biometric data/player account. If there is no required commitment at 208 the player's commitment selection at 206 is applied and the player's information and biometrical data is saved or tagged as an active file at 210. At 212 the player plays the gaming device 10. During play the system compares the limitation(s) to the activity of the player to determine is any imposed limit has been met. If the limitation criteria has not been fulfilled the player may continue play. For example where the player has elected to limit their play to 4 hours in a day, the system compares the time of play to the commitment at 214 as the player plays the gaming device 10. If the limitation has been satisfied at 214, the system generates a signal to the gaming device at 216 to disable the gaming machine from further play by the player. Where a player has moved among various gaming devices 10, the digital cameras 36 capture the facial image of the player and at 204 compare the image to the images in the active file data structure. If a match is obtained the player's limitation(s) are applied and the system checks at 214 to see if the limitation has been reached. Thus the 4 hour limitation may be enforced even though the player has moved to different gaming devices 10.

To reduce the number of files over which the biometrical data must be compared the system is configured to disregard or expunge from the active file data structure the biometrical data associated with any limitation commitment which has been met. Thus, in the example above, when the player's limitation existing for a period of 24 hours from inception has expired, the biometric record for the player is, for example, expunged from the active file data structure. Thus the active file data structure only retains or considers biometric information for active, enforceable, limitations.

Turning to FIG. 4 the function of an embodiment of the present invention is illustrated with regard to a situation where the player has imposed a limit of the cash risked such as $500 for a temporal period such as over a 48 hour period. At 400 the system and gaming device 10 are placed in an operative state. At 402 the gaming device 10 is ready to receive a cash stake such as by a player inserting cash into a bill validator at the gaming device 10. When money is inserted, such as a $100 bill, the system and method of the present invention at 404 determines if the camera 36 can capture an identifying facial image of the player. If no image can be obtained, such as the camera being inoperative or the player obscuring their face, at 406 the money stakes is returned to the player by returning the money from the validator or printing a $100 voucher and dispensing it to the player. If the "biometric" can be obtained at 408 the system compares the biometric, in this example data corresponding to the facial features of the player as captured by the camera 36. If at 408 a match is obtained and the match corresponds with an active limitation commitment, at 410 a determination is made as to whether the player has reached the limit. If the player has exceeded the limit, a signal is generated at 412 to refund the player's stake. If the limit has not been reached has been reached at 414 a determination is made as to whether stake would push the accumulated stake to an amount over the limit of $500. If it would then at 416 the amount over $500 is refunded to the player and the remainder is added at 418 to the credits on the gaming device 10. If the stake of $100 would not cause the limit of $500 to be exceeded at 420 the stake is accepted and converted to credits on the gaming device 10. The process is completed at 422.

As stated above when the temporal period for the limiting criteria has expired (in the above example 48 hours from inception of the limitation) the biometric data associated with the limitation is either disregarded or is expunged to reduce the number of data files for comparison and thereby reduce the number of false positives (incorrect matches).

The limitations can be imposed by the player himself/herself or by others such as a responsible party, regulatory authority, casino venue or other third party.

Enforcement of the limitation can be through one or more of disabling the gaming device, sending a message to the player, sending a message to casino personnel or third party, notification of authorities and the like.

The biometrical data can be a combination of information such as finger print as well as facial image data.

When the temporal period of the limitation has expired the file record may be expunged or tagged as inactive. An inactive file may be reactivated when, for example, a player uses their loyalty card on their next visit.

The system and method can be used across multiple venues such as casinos owned by the same company or casino's in the same geographic area. In such a case the casinos would be networked such that the biometrical and limitation data can be shared.

The foregoing description, for purposes of explanation, uses specific nomenclature and formula to provide a thorough understanding of the invention. It should be apparent to those of skill in the art that the specific details are not required in order to practice the invention. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

What is claimed is:

1. A system for enforcing limitation criteria related to a user's commercial activities at a terminal in a network comprising:
- a device for generating data corresponding to a biometric feature of a terminal user;
- a processor in communication with said terminal over said network;
- apparatus to enter data corresponding to restriction criterion related to a user's commercial activities at said terminal, said restriction criterion having a defined temporal enforcement period;
- a data structure storing said restriction criterion in association with corresponding user biometric data in an associated user file;
- said processor configured to, if said biometric data matches stored biometric data in a user's file in said data structure, enforce said restriction criterion upon the user; and
- said processor is configured to disregard said biometrical data from said user files in said data structure when said corresponding enforcement period has expired.

2. The system of claim 1 comprising said apparatus is a data input device at said terminal.

3. The system of claim 2 comprising said apparatus is a touch screen input device at a display on said terminal.

4. The system of claim 1 comprising apparatus to enter data corresponding to one or more restriction criterion selected from the group consisting of consumption activities, shopping activities and gaming activities.

5. The system of claim 1 comprising a display at said terminal and said processor is configured to control the display to display a message to the user regarding at least one of duration and restriction criterion status.

6. A system for enforcing activity restriction criterion for multiple venues each including one or more user interface terminals comprising:
- a device for generating data corresponding to a biometric feature of users of said terminals;
- a processor;
- apparatus to enter data corresponding to restriction criterion having a defined temporal retention period;
- a data structure storing said restriction criteria in association with a corresponding player biometrical data from said venues in associated user data files;
- said processor configured to, if said generated biometrical data matches stored biometrical data in a user data file in said data structure enforce said restriction criterion upon the player; and
- said processor is configured to expunge said biometrical data from user data files when said corresponding retention periods have expired.

7. The system of claim 6 comprising a local data structure at each of one or more venues storing said user data files and a system-wide data structure storing user data files from all of said venues, said processor configured to, if said generated biometrical data matches the user's stored biometrical data in a player file in said data structures enforce said restriction criterion upon the user.

8. The system of claim 6 comprising a local processor for each data structure and a host processor for said system-wide data structure, said local and host processors configured to determine if said generated biometrical data matches stored biometrical data in a user file in a local data structure enforce said restriction criterion upon the user and (b) if the condition of (a) does not exist provide communication with said host processor, said host processor configured to determine if said generated biometrical data matches stored biometrical data in user data files in said system-wide data structure enforce said restriction criterion upon the user.

9. The system of claim 6 comprising said apparatus is a data input device at the terminals.

10. The system of claim 9 comprising said apparatus is a touch screen input device at a display on said terminals.

11. The system of claim 6 comprising apparatus for a player to enter data corresponding to one or more limitation criterion selected from the group consisting of consumption activities, shopping activities and gaming activities.

12. The system of claim 6 comprising a display at said terminals and said processor is configured to control the display to display a message to the user regarding at least one of duration and restriction criterion status.

13. The system of claim 6 comprising said processor is configured to generate a signal to disable the terminal in the event the generated biometrical data matches stored biometrical data in a user file in said data structure.

14. The system of claim 6 comprising said device for capturing biometrical data includes a digital camera.

15. The system of claim 14 comprising said device is a digital camera at said terminal configured to capture data corresponding to facial features of the user.

16. A method for activity restrictions on a user at a user terminal and for reducing forcing said restrictions based upon false positive comparisons, said system comprising:

(a) enabling a processor and data structure to receive and store for a user in a user data file data corresponding one or more of said restrictions, an associated biometrical sample data for identification purposes and an associated temporal period for enforcement of said one or more restrictions;

(b) configuring said processor to disregard biometrical sample data from said user data files in said data structure when said associated temporal periods have expired;

(c) configuring said processor to receive biometrical data captured of a user using a terminal, compare said captured data to biometrical data remaining in said user data files at said data structure and if said biometric data matches data stored in a user data file enforce said restriction on the user associated with the corresponding user data file, whereby disregarding of said biometric data at step (b) reduces the number of biometric data files in said data structure and probabilities of said comparison resulting in a false match.

17. The method of claim 16 comprising configuring said processor to expunge said biometrical sample data from said user data files in said data structure when said associated temporal periods have expired.

* * * * *